I. D. MORRISON & L. J. ANDREWS.
CAR BRAKE.
APPLICATION FILED OCT. 4, 1909.
972,899.
Patented Oct. 18, 1910.
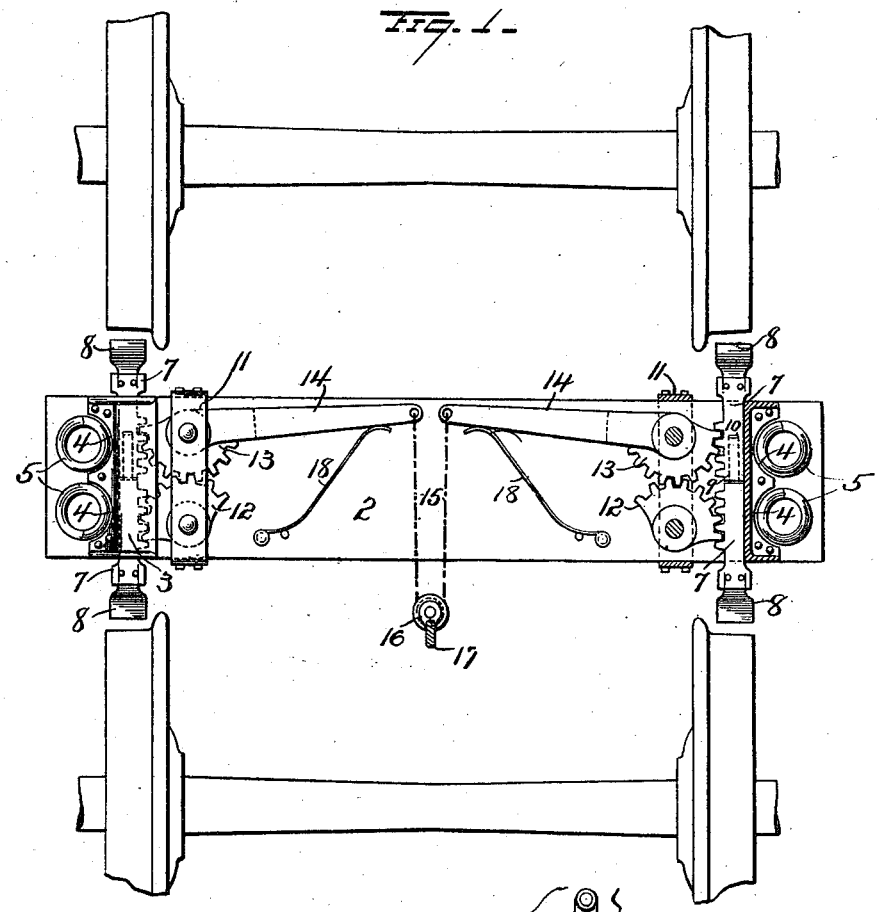
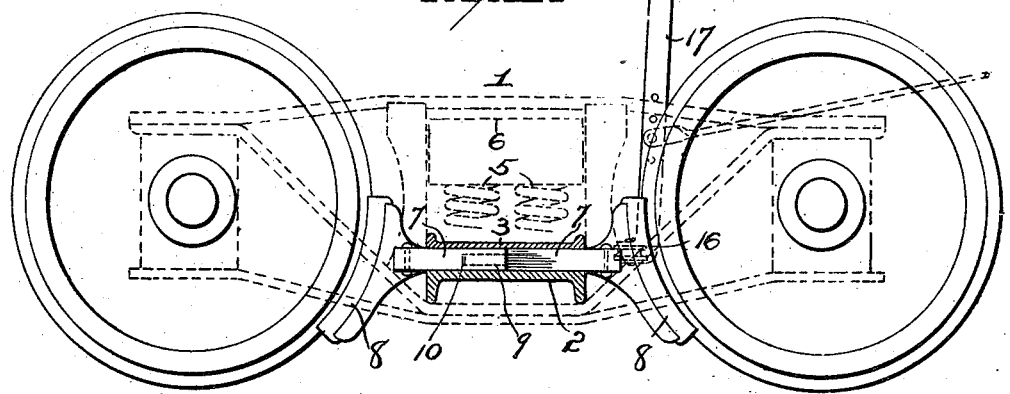
WITNESSES
INVENTORS
Attorney

UNITED STATES PATENT OFFICE.

IRA D. MORRISON AND LOUIS J. ANDREWS, OF SAVANNAH, GEORGIA.

CAR-BRAKE.

972,899.  Specification of Letters Patent.  Patented Oct. 18, 1910.

Application filed October 4, 1909.  Serial No. 520,859.

*To all whom it may concern:*

Be it known that we, IRA D. MORRISON and LOUIS J. ANDREWS, of Savannah, in the county of Chatham and State of Georgia, have invented certain new and useful Improvements in Car-Brakes; and we do hereby declare the following to be a full, clear, and exact description of the invention, such as will enable others skilled in the art to which it appertains to make and use the same.

This invention relates to improvements in car brakes,—the object of the invention being to so construct a car brake that the use of brake-beams will be avoided and so that the barke-shoes can be applied to the wheels with great force but with the expenditure of a minimum amount of power applied to the operating devices.

A further object is to provide simple and efficient brake operating devices which shall employ no parts depending from the truck and which will permit the brake-shoes to be normally out of contact with the wheels.

A further object is to provide a car brake comprising a minimum number of parts and which shall be efficient in all respects.

With these objects in view the invention consists in certain novel features of construction and combinations of parts as hereinafter set forth and pointed out in the claims.

In the accompanying drawings, Figure 1 is a plan view of a car truck showing the application of our improved brake thereto, and Fig. 2 is a longitudinal sectional view partly in elevation.

1 represents a car truck, at each end of the spring plank 2 of which, guides or housings 3 are secured and the outer portions of these guides or housings may be recessed as at 4 for the accommodation of the springs 5 upon which the truck bolster 6 rests. Each housing 3 incloses two rack-bars 7 which project, respectively beyond the respective ends of the housing and have secured to their outer ends, brake-shoes 8 to engage the treads of the front and rear wheels of the truck. In order to insure proper alinement of the two rack-bars 7, one of them may be provided with a guide pin 9 to enter a socket 10 in the other. A bracket 11 is secured to the spring-board or plank 2 in proximity to each of the guides or housings 3 and between each bracket 11 and the spring plank, two toothed segments 12—13 are mounted so as to intermesh with each other and respectively with the rack-bars 7 and 10. One of the toothed-segments of each pair is provided with an arm or lever 14 and these arms or levers have attached to them, the respective ends of a chain 15,—the intermediate portion of which latter passes over a suitable pulley 16 carried by a rod or bar 17 to which power for operating the brakes may be applied in any suitable manner. Springs 18 are secured to the spring plank 2 and bear against the arms or levers 14 so as to cause the brake-shoes at the outer ends of the rack-bars 7 to be normally disposed out of contact with the wheels.

It is apparent that when power is applied to the rod or bar 17, both levers 14 will be moved and the two segments with which said levers are connected will be partially rotated and transmit motion to the rack-bars with which they mesh and also transmit motion through the other toothed segment to the other rack-bars and thus the rack-bars of each pair will be moved simultaneously in opposite directions to apply the brake-shoes to the front and rear wheels of the truck.

Our improvements are simple in construction, comprising few parts, not liable to get out of order or to project laterally or downwardly from the portions of the truck which support them, and can be operated with comparatively little power to apply the brake-shoes with great force to the wheels.

Having fully described our invention what we claim as new and desire to secure by Letters-Patent, is,—

1. The combination with a car truck and guides or housings thereon, of alining rack-bars mounted in said housing, brake-shoes carried by the respective rack-bars, said rack-bars having teeth at the same side thereof, and means for moving said rack-bars simultaneously in opposite directions.

2. The combination with a car truck and housings thereon, of two rack-bars mounted in each housing, brake-shoes secured to the rack-bars, intermeshing toothed-segments mounted in the truck and meshing with said rack-bars, and means for transmitting motion to said two segments to move the rack-bars in opposite directions and apply the brake-shoes to the wheels.

3. The combination with a car truck and a housing located on the spring plank thereof, of two alining rack-bars located in said housing and projecting beyond the respective ends thereof, brake-shoes at the exposed ends of said rack-bars, two intermeshing toothed segments mounted on the spring plank and meshing respectively with the respective rack-bars, an arm or lever secured to one of said toothed segments and means connected with said arm or lever for moving it to apply the brake-shoes to the wheels.

4. The combination with a car truck and housing located upon respective ends of the spring plank thereof, of two rack-bars mounted in each housing and projecting beyond the ends thereof, a brake-shoe carried by each rack-bar, two pairs of intermeshing toothed segments mounted on the spring plank and meshing with said rack-bars, an arm or lever secured to one toothed segment of each pair, springs bearing against said arms or levers and tending to move the same in a direction to move the brake shoes away from the wheels, and means connected with said levers for operating them to apply the brake shoes to the wheels.

In testimony whereof, we have signed this specification in the presence of two subscribing witnesses.

IRA D. MORRISON.
LOUIS J. ANDREWS.

Witnesses:
J. D. BRODMANN,
GEO. BRODMANN.